(12) United States Patent
Goldenberg et al.

(10) Patent No.: US 10,654,398 B1
(45) Date of Patent: May 19, 2020

(54) TOY HAULER RECREATIONAL VEHICLE

(71) Applicant: Grand Design RV, LLC, Middlebury, IN (US)

(72) Inventors: Nathan Goldenberg, Granger, IN (US); Ryan B. Getz, Goshen, IN (US); Thomas R. Cramer, Elkhart, IN (US)

(73) Assignee: Grand Design RV, LLC, Middlebury, IN (US)

( * ) Notice: Subject to any disclaimer, the term of this patent is extended or adjusted under 35 U.S.C. 154(b) by 183 days.

(21) Appl. No.: 16/058,518

(22) Filed: Aug. 8, 2018

Related U.S. Application Data (63) Continuation of application No. 15/267,562, filed on Sep. 16, 2016, now Pat. No. 10,046,690.

(51) Int. Cl.
*B60P 3/39* (2006.01)
*B60P 3/34* (2006.01)

(52) U.S. Cl.
CPC .. *B60P 3/39* (2013.01); *B60P 3/34* (2013.01)

(58) Field of Classification Search
CPC .... B60P 3/34; B60P 3/32; B60P 3/341; B60P 3/39; B60R 13/06; B60J 10/00; Y10T 29/49622; B62D 21/02; B62D 33/046
See application file for complete search history.

(56) References Cited

U.S. PATENT DOCUMENTS

| | | | |
|---|---|---|---|
| 2,541,288 A | 2/1951 | Rice | |
| 3,961,716 A | 6/1976 | Renaud | |
| 4,253,699 A | 3/1981 | Frank | |
| 4,268,209 A | 5/1981 | Westerman | |
| 4,854,631 A * | 8/1989 | Laursen | B60P 3/32 296/158 |
| 4,869,545 A * | 9/1989 | Notermann | B60P 3/1041 296/157 |
| 5,031,563 A | 7/1991 | Matre | |
| 5,342,106 A * | 8/1994 | Fischer | B62D 27/04 296/164 |
| 5,374,094 A | 12/1994 | Smith et al. | |
| 5,921,615 A * | 7/1999 | Gimenez | B60P 3/32 280/783 |
| 5,967,583 A | 10/1999 | Wishart | |

(Continued)

FOREIGN PATENT DOCUMENTS

| | | |
|---|---|---|
| DE | 102005036590 A1 | 3/2006 |
| EP | 0748718 B1 | 12/1996 |
| EP | 1405760 A1 | 4/2004 |

OTHER PUBLICATIONS

Fun Mover 2008 Product Brochure, Four Winds International (2008), www.FUNMOVER-RV.com, 16 pages.

(Continued)

*Primary Examiner* — Kiran B Patel
(74) *Attorney, Agent, or Firm* — Faegre Drinker Biddle & Reath LLP (57) ABSTRACT

A recreational vehicle includes first, second and third living areas, each having a floor, and a garage located below the third living area. A bed is located in the third living area and is moveable between a lowered position and a raised position. The garage has an adjustable height defined by a distance between a garage floor and a ceiling. The adjustable height is greater when the bed is in the raised position than the adjustable height in the lowered position.

25 Claims, 12 Drawing Sheets

(56) References Cited

U.S. PATENT DOCUMENTS

| | | | | |
|---|---|---|---|---|
| 6,135,532 | A * | 10/2000 | Martin | B60P 1/435 14/71.1 |
| 6,170,903 | B1 * | 1/2001 | Crean | B60P 3/34 296/168 |
| 6,231,115 | B1 | 5/2001 | Crean | |
| 6,290,284 | B1 * | 9/2001 | Crean | B60P 3/34 296/168 |
| 6,439,648 | B1 | 8/2002 | Crean | |
| 6,494,285 | B1 | 12/2002 | Williams | |
| 6,502,894 | B1 * | 1/2003 | Ingram | B60P 3/36 280/789 |
| 6,557,190 | B2 | 5/2003 | Bailey | |
| 6,692,062 | B1 * | 2/2004 | Woodard | B60P 3/32 296/164 |
| 6,729,678 | B1 * | 5/2004 | Atcravi | B60P 3/34 296/165 |
| 6,860,545 | B1 | 3/2005 | Ingram et al. | |
| 6,899,375 | B2 | 5/2005 | Sankrithi et al. | |
| 6,983,979 | B2 * | 1/2006 | Rasmussen | A47C 17/84 296/156 |
| 6,983,980 | B2 | 1/2006 | Rasmussen | |
| 6,988,760 | B2 | 1/2006 | Rasmussen | |
| 7,111,897 | B2 | 9/2006 | Ingram et al. | |
| 7,147,268 | B2 | 12/2006 | Winter | |
| 7,198,320 | B2 | 4/2007 | Rasmussen | |
| 7,240,945 | B1 * | 7/2007 | Crean | B60R 11/02 296/37.7 |
| 7,334,827 | B1 * | 2/2008 | Crean | B60P 3/34 296/26.01 |
| 7,338,109 | B1 * | 3/2008 | Crean | B60P 3/34 296/164 |
| 7,347,484 | B2 | 3/2008 | Nebel | |
| 7,610,636 | B2 | 11/2009 | Holmes et al. | |
| 7,618,085 | B1 | 11/2009 | Bean | |
| 7,878,545 | B2 * | 2/2011 | Rhymer | B60P 3/32 280/441.2 |
| 7,967,338 | B1 * | 6/2011 | Anderson | B62D 21/20 280/783 |
| 8,505,974 | B2 | 8/2013 | Rhymer et al. | |
| 8,590,917 | B2 | 11/2013 | Lee | |
| 8,864,206 | B2 | 10/2014 | Miller et al. | |
| 8,911,196 | B2 * | 12/2014 | Cazes | B60P 3/07 296/158 |
| 9,604,564 | B1 * | 3/2017 | Pellicer | B60P 3/34 |
| 10,046,690 | B1 | 8/2018 | Goldenberg et al. | |
| 2002/0043812 | A1 * | 4/2002 | Crean | B62D 21/02 296/26.13 |
| 2002/0066184 | A1 * | 6/2002 | Crean | B62D 21/02 29/897.2 |
| 2003/0099532 | A1 * | 5/2003 | Williams | B60P 3/07 414/538 |
| 2004/0261267 | A1 * | 12/2004 | Crean | B62D 21/02 29/897.2 |
| 2006/0066131 | A1 | 3/2006 | Nebel | |
| 2006/0108784 | A1 | 5/2006 | Van Der Bijl | |
| 2007/0007793 | A1 * | 1/2007 | Crean | B60R 13/0815 296/156 |
| 2007/0007794 | A1 * | 1/2007 | Bertoch | B62D 21/20 296/168 |
| 2008/0001427 | A1 * | 1/2008 | Day | B60P 3/36 296/156 |
| 2009/0102231 | A1 * | 4/2009 | Atcravi | B60P 3/34 296/175 |
| 2009/0134600 | A1 * | 5/2009 | Tinley | B62D 21/20 280/441.2 |
| 2009/0159108 | A1 * | 6/2009 | Dannewitz | B60P 3/064 135/88.05 |
| 2010/0127477 | A1 * | 5/2010 | Ousley | B60R 1/003 280/433 |
| 2012/0220176 | A1 * | 8/2012 | Neprud | B60F 3/00 440/12.52 |
| 2012/0261902 | A1 * | 10/2012 | Graber | B60P 3/32 280/433 |
| 2014/0004761 | A1 * | 1/2014 | Neprud | B60F 3/0069 440/12.52 |
| 2015/0291229 | A1 * | 10/2015 | Connor | B62D 21/20 296/168 |
| 2015/0291236 | A1 * | 10/2015 | Kseizopolski | B60P 3/34 277/637 |
| 2015/0329035 | A1 | 11/2015 | Johnson et al. | |
| 2016/0096465 | A1 | 4/2016 | Kauffman et al. | |
| 2016/0144767 | A1 | 5/2016 | Snell | |
| 2016/0347230 | A1 * | 12/2016 | Pellicer | B60P 3/34 |
| 2017/0113594 | A1 * | 4/2017 | Pellicer | B60P 3/34 |

OTHER PUBLICATIONS

Open Road RV Center, 2005 Travel Supreme Travel Supreme 41DS02B Internet Sales Ad, Printed Jun. 25, 2019 from https://www.openroadrvcenter.com/inv/2005-Travel-Supreme-Travel-Supreme-41DS02B-CO272/; 5 pages.

Ray Citte RV, 2011 Dutchmen Denali 280 LBS—Internet Sales Ad, Printed Jun. 25, 2019 from https://www.raycitte.com/rv/roy+ut/dutchmen+fifthwheel/2499/dutchmen+denali+280lbs; 8 pages.

RV Trader Internet Sales Listing for 2006 Travel Supreme 41DS 02B ME, Printed Jun. 25, 2019 from https://www.rvtrader.com/listing/2006-Travel-Supreme-TRAVEL-SUPREME-41DS-02B-ME-5007717705, 7 pages.

RVSellersUSA.com Internet Sales Listing for 2006 Travel Supreme 41DS 02B, Printed Jun. 25, 2019 from https://www.rvsellersusa.com/for_sale_by_owner/2006_Travel_Supreme_41DS-02B/7215, 5 pages.

* cited by examiner

TOY HAULER RECREATIONAL VEHICLE

CROSS-REFERENCE TO RELATED APPLICATION

This application claims priority to Non-Provisional application Ser. No. 15/267,562, filed Sep. 16, 2016, which is herein incorporated by reference in its entirety.

TECHNICAL FIELD

The present invention relates to recreational vehicles and, more particularly, to a toy hauler recreational vehicle.

SUMMARY

In one embodiment of the present invention, a recreational vehicle includes a first living area having a floor, a second living area having a floor located at a level below the floor of the first living area, a third living area having a floor located at a level above the level of the floor of the second living area and a bed located in the third living area. The bed includes a platform supported above the floor of the third living area by a support structure. The support structure includes a first side, a second side and an end. The platform has an upper surface and a lower surface and is movable from a first position in which the lower surface of the platform is located adjacent the support structure to a second position in which the lower surface of the platform is spaced above and apart from the support structure. The recreational vehicle further includes a garage located below the third living area. The garage includes a floor, a first side wall, a front end, a second side wall and a ceiling defined at least in part by the lower surface of the bed platform.

In one embodiment of the invention, the garage includes a second ceiling located closer to the floor of the garage than the ceiling. In another embodiment of the invention, the ceiling is the lower surface of the bed platform.

A recreational vehicle according to another embodiment of the present invention includes a first living area having a floor, a second living area having a floor located at a level below the floor of the first living area, a third living area having a floor located at a level above the level of the floor of the second living area, a garage located below the third living area and a chassis. The chassis has a first section located beneath the first living area, a second section located beneath the second living area, a third section located beneath the third living area and the garage and a pair of longitudinally extending side rails extending the length of the third section and extending a portion of the length of the second section. Each of the side rails has an upper surface. The chassis further includes at least one truss located in the second section. The truss has a first end connected to one of the side rails, a second end connected to the other side rail and an upper surface located at substantially the same height as the upper surface of each of the side rails. The chassis also includes at least one beam located in the third section. The beam has a first end connected to one of the side rails, a second end connected to the other side rail and an upper surface located at a level lower than the upper surface of the truss. The third section includes an unobstructed area above the beam and between the side rails. In one embodiment, the beam supports the floor of the garage.

In another embodiment, the chassis further includes at least one reinforcing member connected to at least one of the side rails in the third section. In one embodiment, the reinforcing member is a vertically extending I-beam. In another embodiment, the chassis includes a second reinforcing member connected to at least one of the frame rails in the third section and a third reinforcing member connecting the first and second reinforcing members.

DETAILED DESCRIPTION

Figure 1:
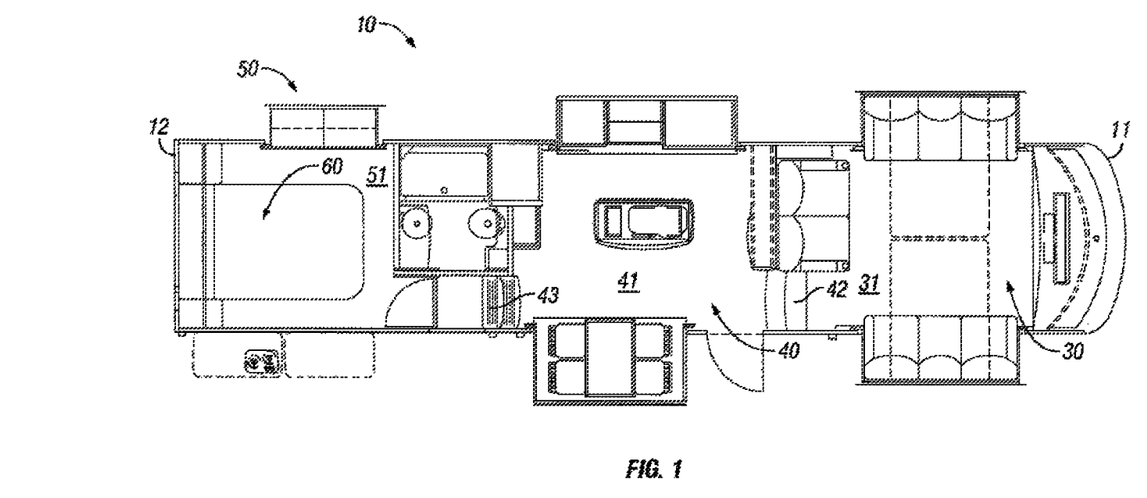
FIG. 1 is a plan view of the interior of a recreational vehicle according to one embodiment of the present invention.
Figure 1A:
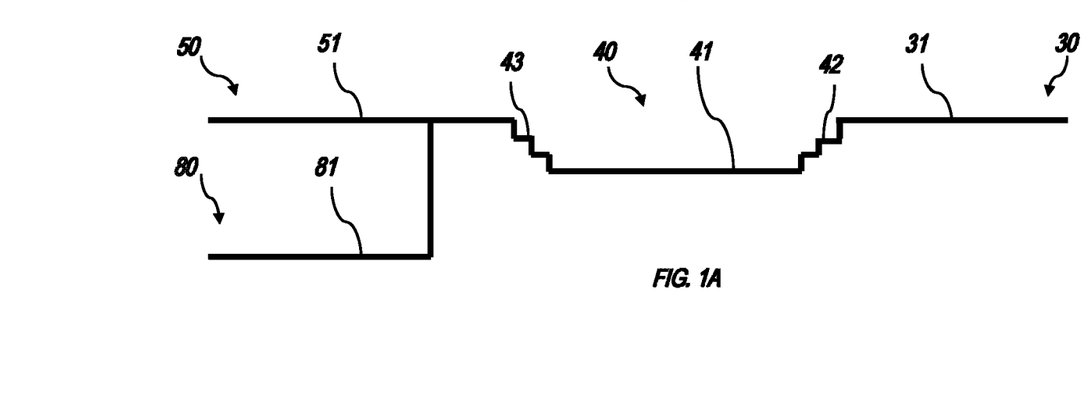
FIG. 1A is a schematic elevation view of portions of the floors of the recreational vehicle of FIG. 1, as described herein.

Referring to FIG. 1, recreational vehicle 10 includes a front or hitch end 11 and a rear or garage/bedroom end 12. In the embodiment shown, the interior of recreational vehicle 10 includes a first living area 30 having a floor 31, a second living area 40 having a floor 41, and a third living area 50 having a floor 51. Floor 31 is elevated above floor 41. Steps 42 provide access between first living area 30 and second living area 40. Similarly, floor 51 is elevated above floor 41. Steps 43 provide access between second living area 40 and third living area 50.

Figure 2:
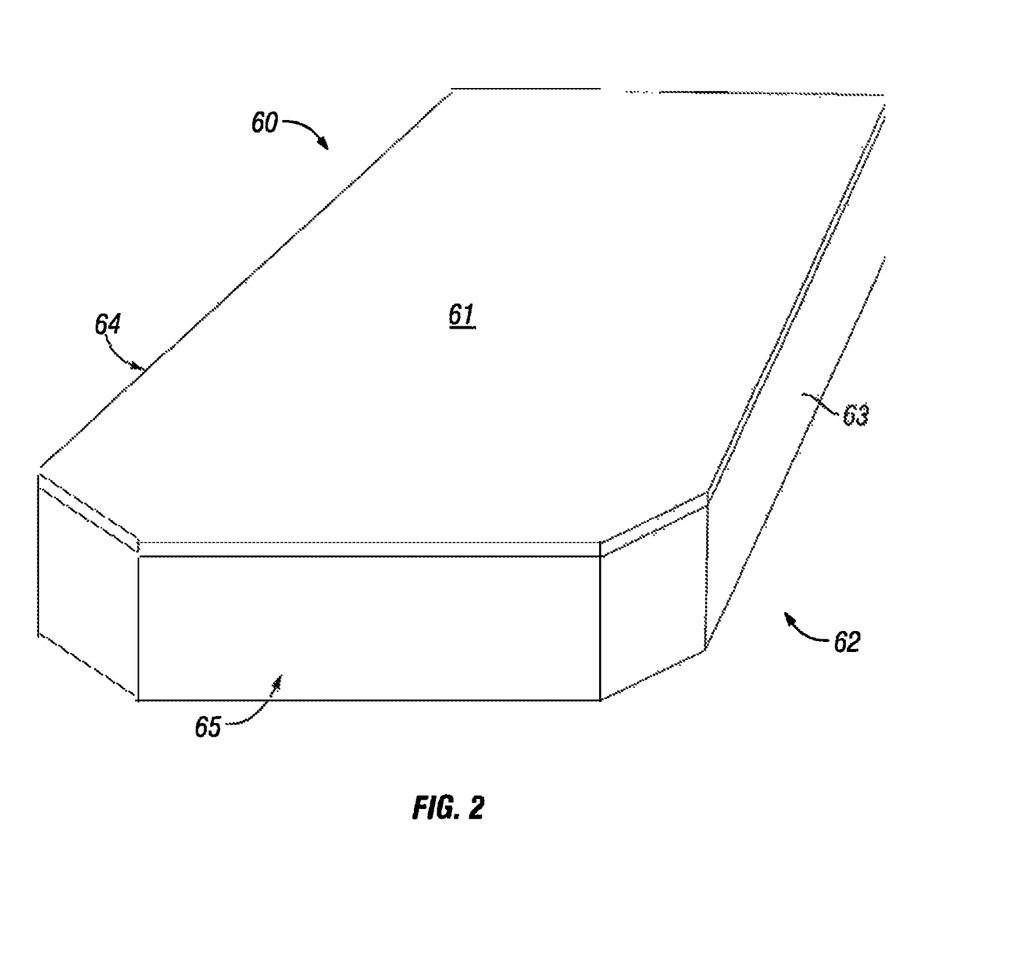
FIG. 2 is a perspective view of a first embodiment of a bed that is component of the recreational vehicle shown in FIG. 1.

As shown in FIGS. 1 and 2, third living area 50 includes a bed 60. Bed 60 generally includes a raised platform 61 supported above floor 51 by a support structure 62. Platform 61 may be used to support a mattress or other sleeping surface. Support structure 62 generally includes a first side 63, a second side 64 and a first end 65.

Figure 3:
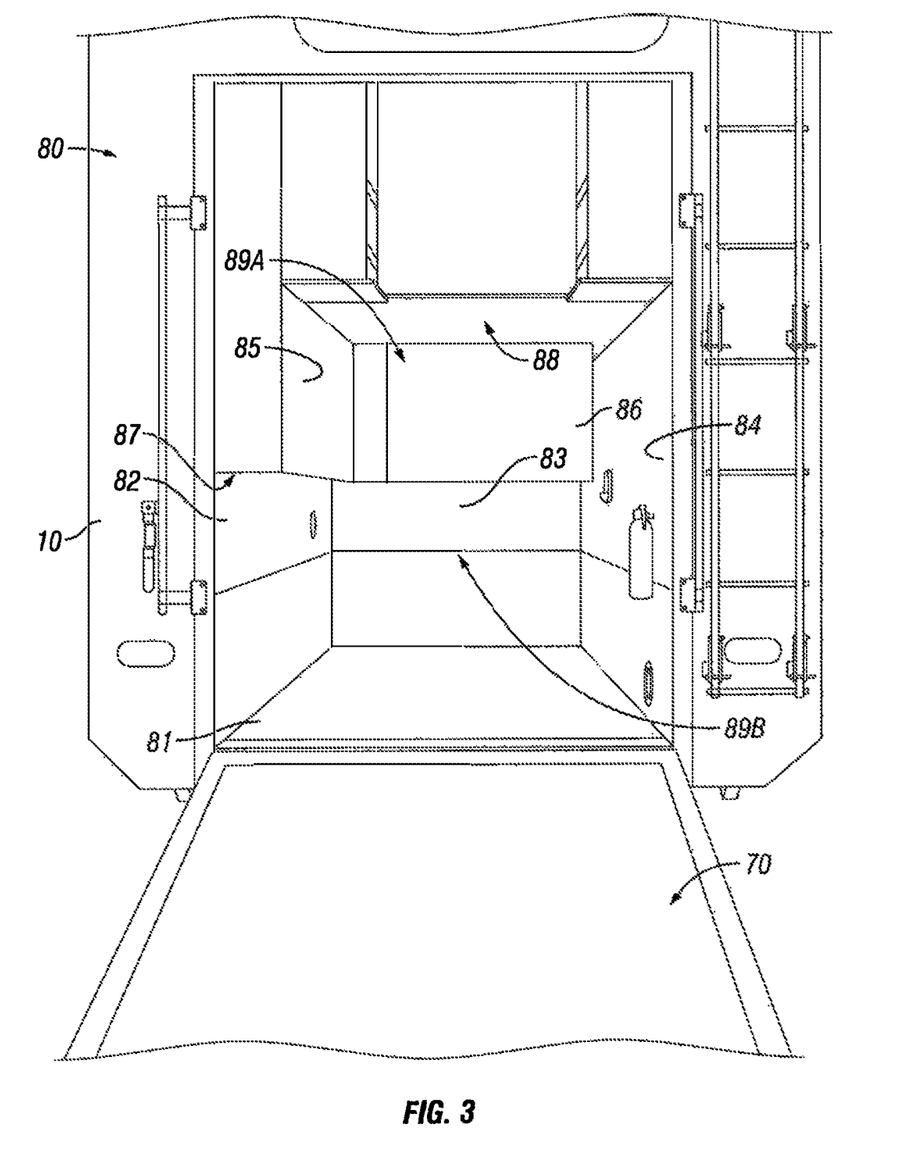
FIG. 3 is a rear elevational view of the recreational vehicle shown in FIG. 1 with the garage ramp door in the open position.

Second end 12 of recreational vehicle 10 further includes a fold-down ramp door 70 that provides access to a garage 80 located beneath third living area 50. As shown in FIG. 3, Garage 80 generally includes a floor 81, a first side wall 82, a front wall 83, a second side wall 84, an inner side wall 85, an inner front wall 86, a first or lower ceiling 87 and a second or upper ceiling 88. Lower ceiling 87 extends adjacent first side wall 82 and front wall 83 below inner side wall 85 and inner front wall 86. Upper ceiling 88 of garage 80 is positioned directly below platform 61 of bed 60 such that space 89A in garage 80 corresponds to the space below platform 61 and bounded by first side 63, second side 64 and first end 65 of support structure 62 of bed 60. Garage 80 further includes a second space 89B extending from first side wall 82 to second side wall 84 below lower ceiling 86.

Figure 4:
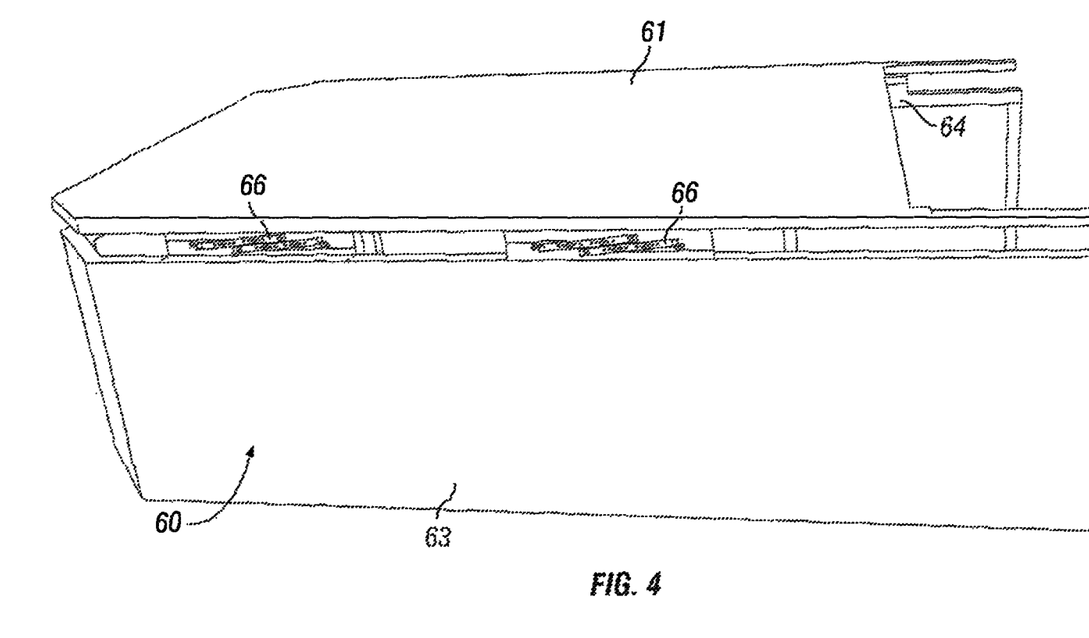
FIG. 4 is a perspective view of a second embodiment of the bed shown in FIG. 2 with the platform in the lowered position.
Figure 5:
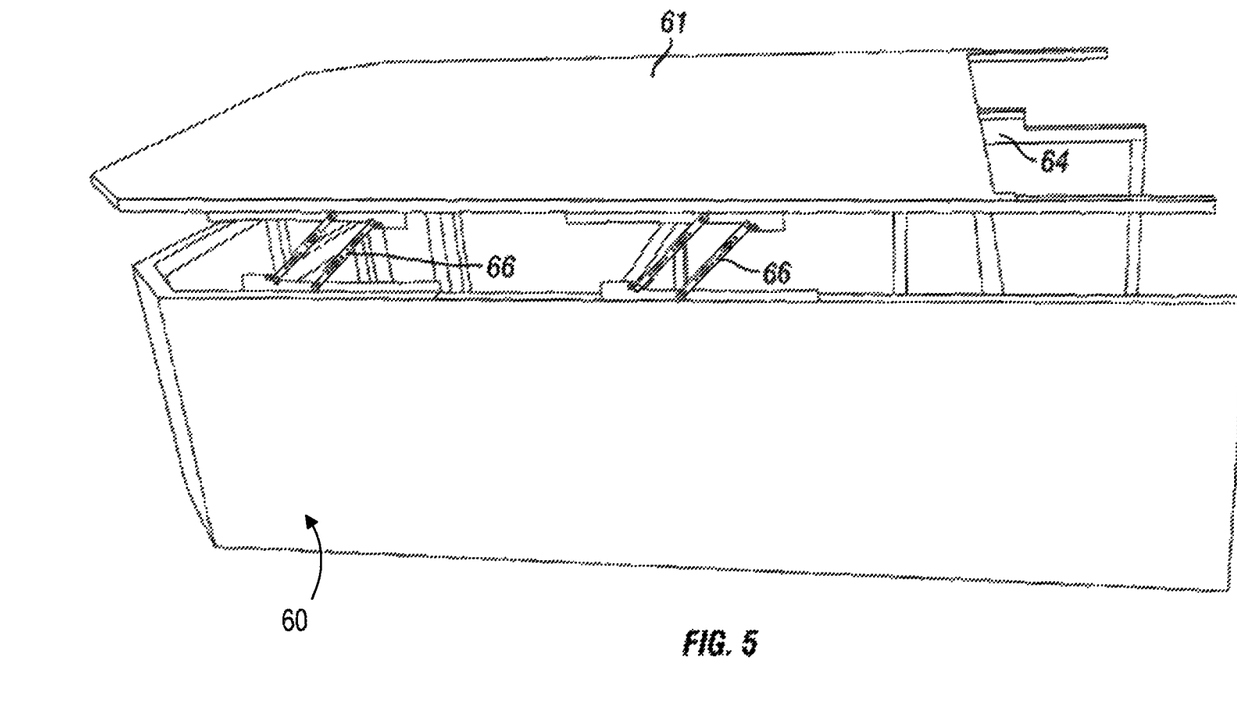
FIG. 5 is a perspective view of a second embodiment of the bed shown in FIG. 2 with the platform in an intermediate position.
Figure 6:
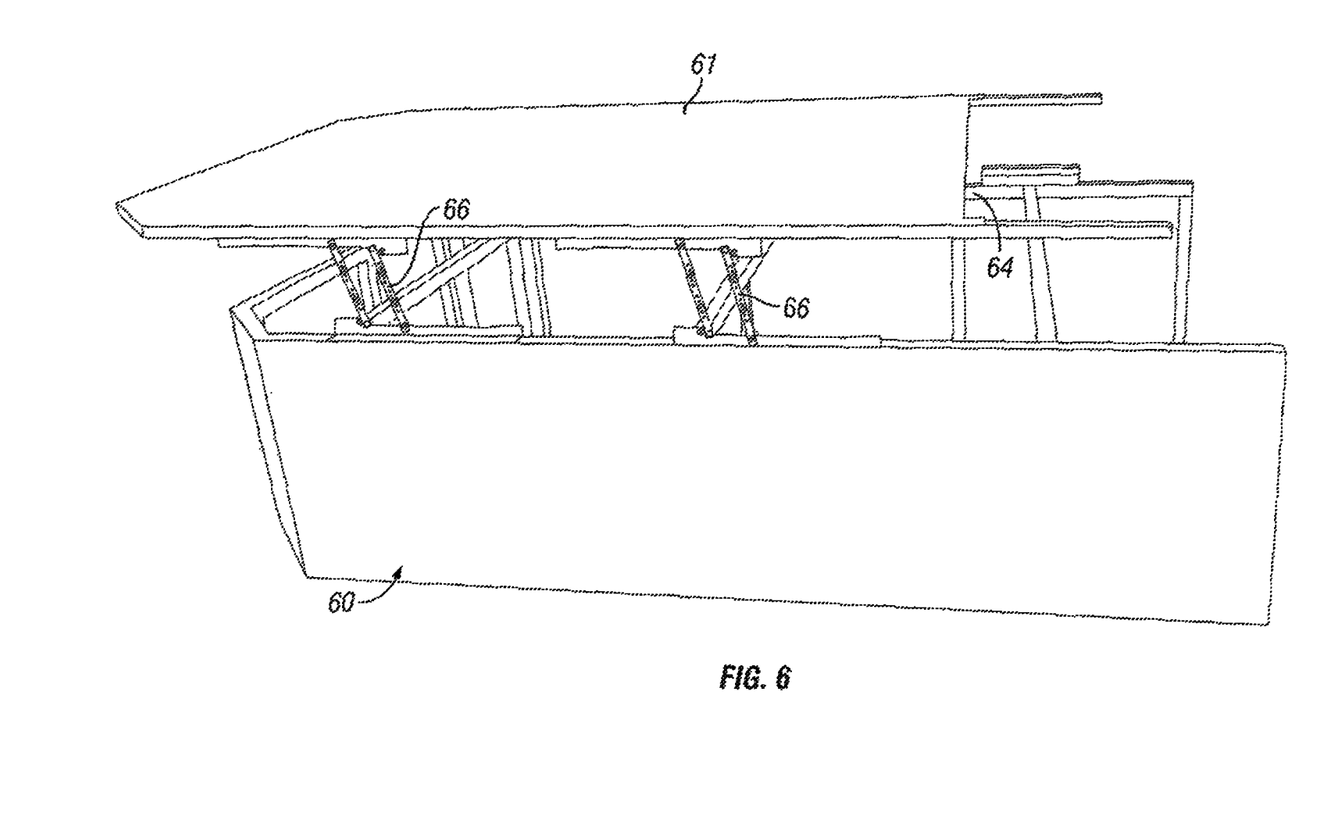
FIG. 6 is a perspective view of a second embodiment of the bed shown in FIG. 2 with the platform in the fully raised position.
Figure 7:
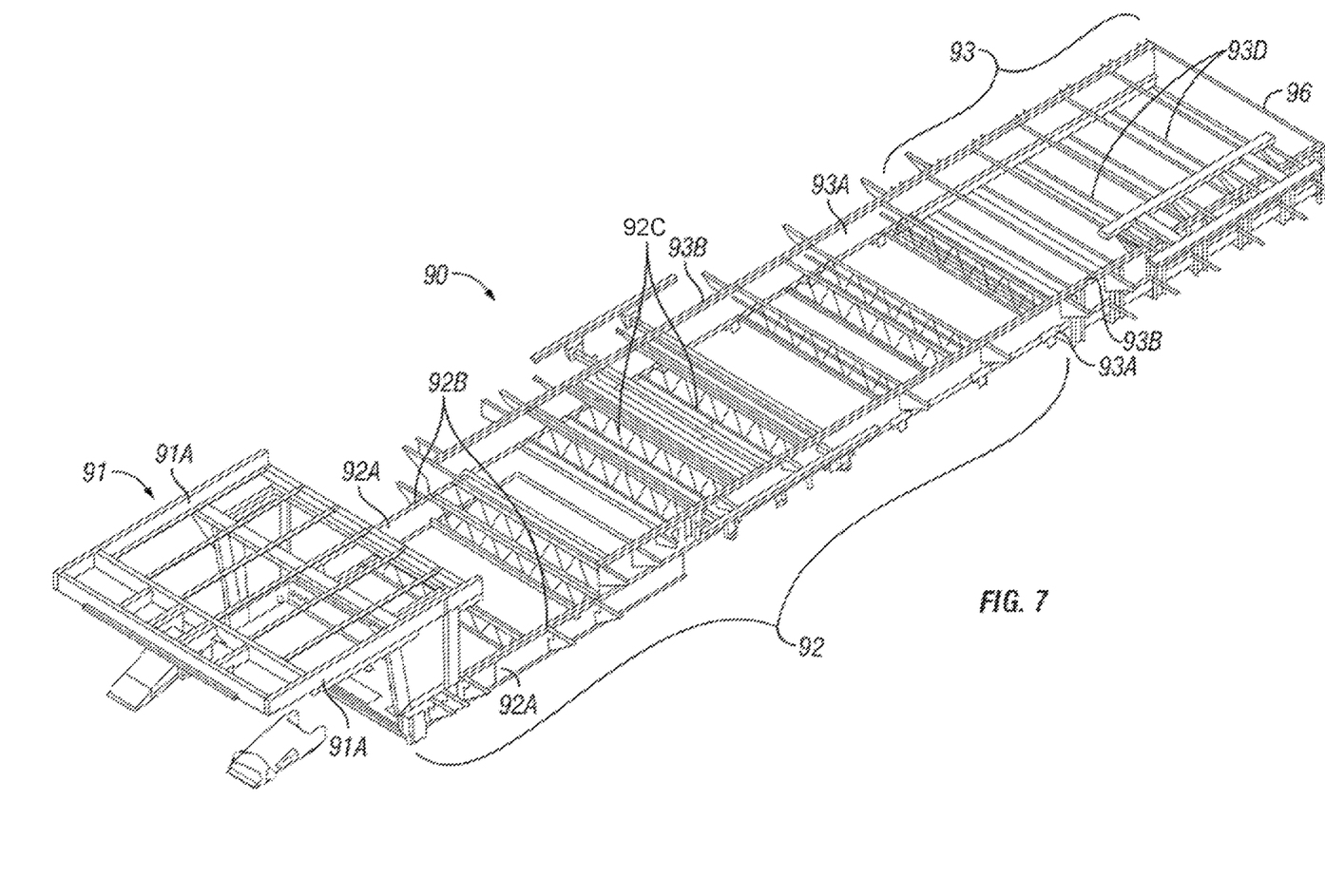
FIG. 7 is a perspective view of a chassis that is a component of the recreational vehicle shown in FIG. 1.
Figure 8:
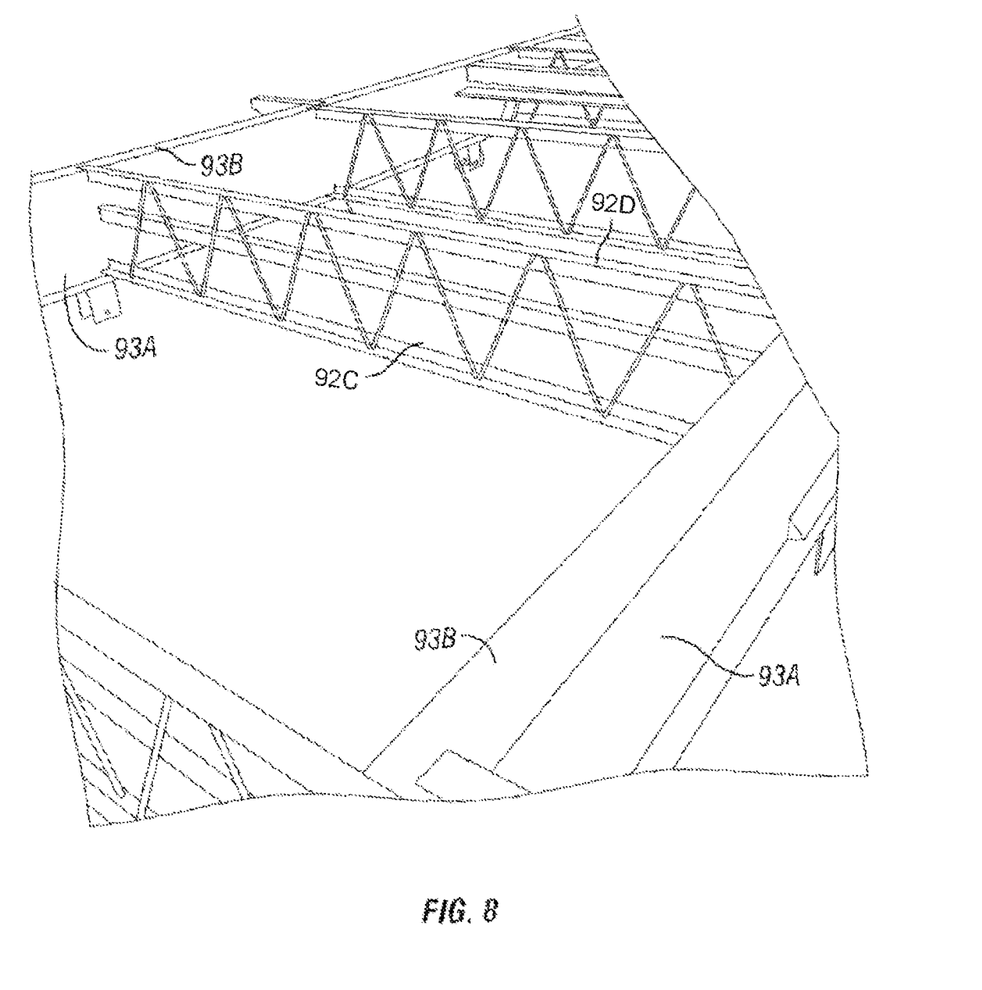
FIG. 8 is a perspective view of a section of the chassis shown in FIG. 7.
Figure 9:
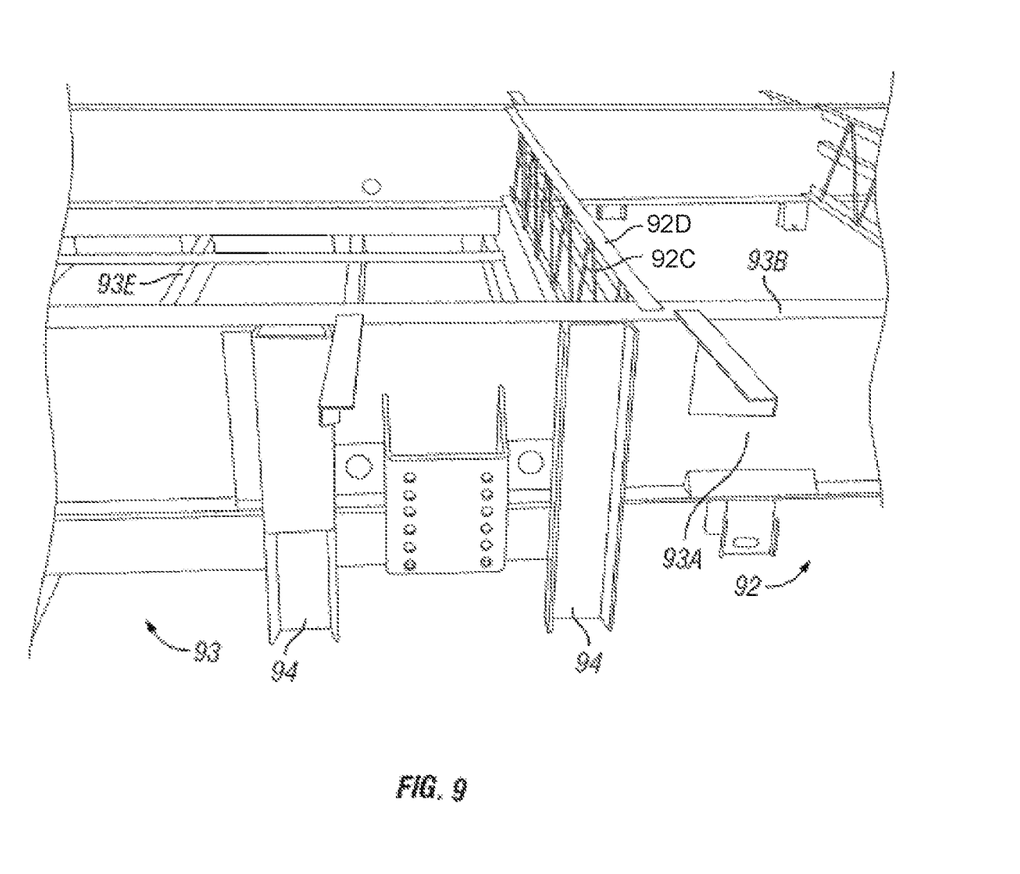
FIG. 9 is a side view of a section of the chassis shown in FIG. 7.
Figure 10:
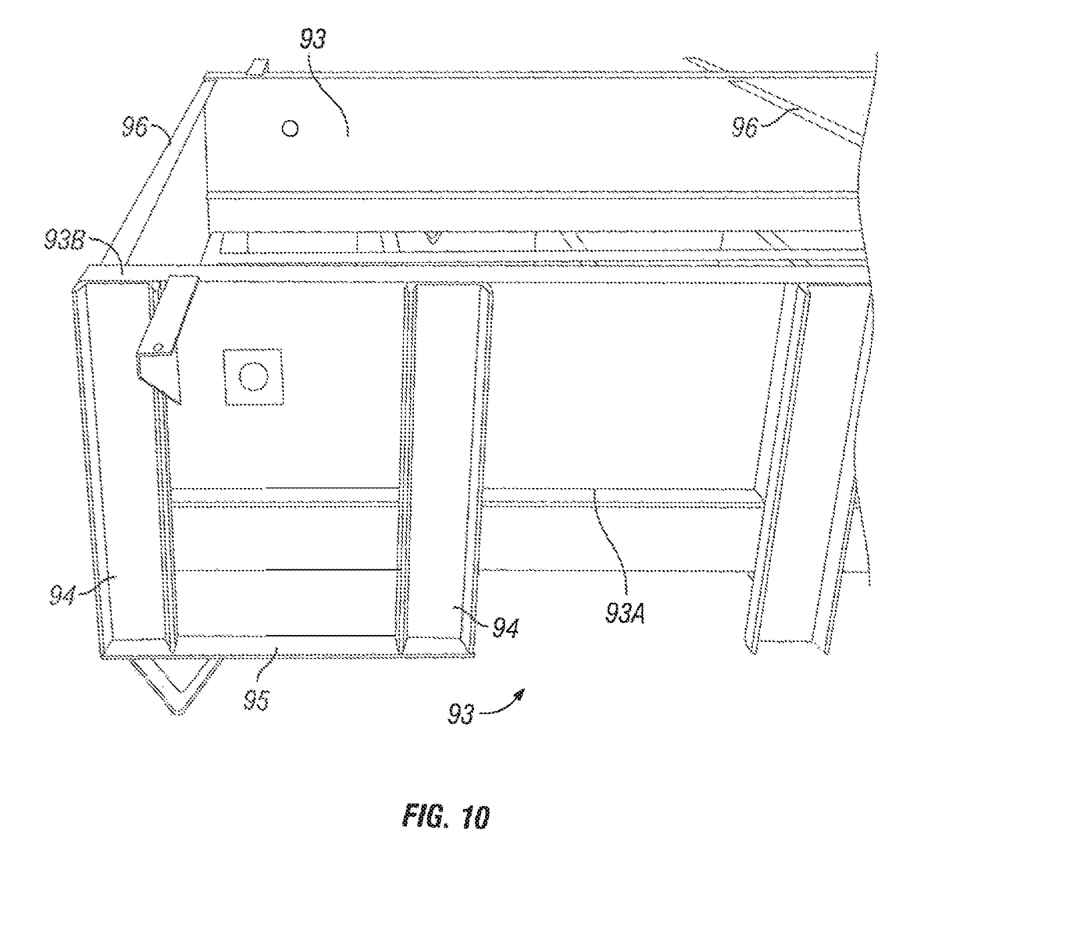
FIG. 10 is a side view of a section of the chassis shown in FIG. 7.

FIGS. 4-6 show an alternative embodiment of bed 60. In this embodiment, platform 61 is connected to first side 63 and second side 64 of support structure 62 by pivoting swing arms 66. This permits platform 61 to be selectively raised from its lowered position shown in FIG. 4 to its raised position shown in FIG. 6. To raise platform 61, the user simply lifts it and pulls or pushes it in the direction of first end 65 of support structure 62. Platform 61 is lowered by pulling or pushing it downward and away from first end 65 of support structure 62. In this manner, the height of upper ceiling 88 of garage 80 may be increased to provide greater clearance.

Referring to FIGS. 7-10, recreational vehicle 10 includes a chassis 90 having a first section 91 located beneath first living area 30, a second section 92 located beneath second living area 40 and a third section 93 located beneath third living area 50 and garage 80. First section 91 includes two longitudinally extending side rails 91A. Second section 92 includes a first pair of longitudinally extending side rails 92A, each having an upper surface 92B. Second section 92 and third section 93 include a shared pair of longitudinally extending side rails 93A, each having an upper surface 93B. Side rails 93A are connected to the upper surface 92B of side rails 92A.

Second section 92 further includes trusses 92C connected at opposite ends to side rails 93A. Trusses 92C have upper surfaces 92D located at substantially the same height as upper surfaces 93B of side rails 93A. Trusses 92C provide structural support and rigidity to second section 92 of chassis 90. Third section 93 of chassis 90 does not include trusses. Rather, third section 93 includes a plurality of beams 93D that are connected at opposite ends to side rails 93A. Beams 93D have upper surfaces 93E and are positioned such that upper surfaces 93E are lower than upper surfaces 92D of trusses 92C. As a result, third section 93 is an open area with no obstructions located above beams 93D and between those portions of side rails 93A that extend along third section 93. In order to provide sufficient support and rigidity to third section 93 of chassis 90 without the use of trusses 92C, a plurality of vertically extending reinforcing members 94 are connected (as by welding) to the outer surface of side rails 93A in third section 93 of chassis 90. In the embodiment shown, reinforcing members 94 are I-beams. Reinforcing members 94 may be connected at one or both ends by a reinforcing member 95 to provide added rigidity. Additional stabilizing members 96 may be connected at opposite ends to side rails 93A for purposes of stabilizing third section 93 of chassis 90 during shipping. Stabilizing members 96 are removed during constructions of recreational vehicle 10.

Figure 11:
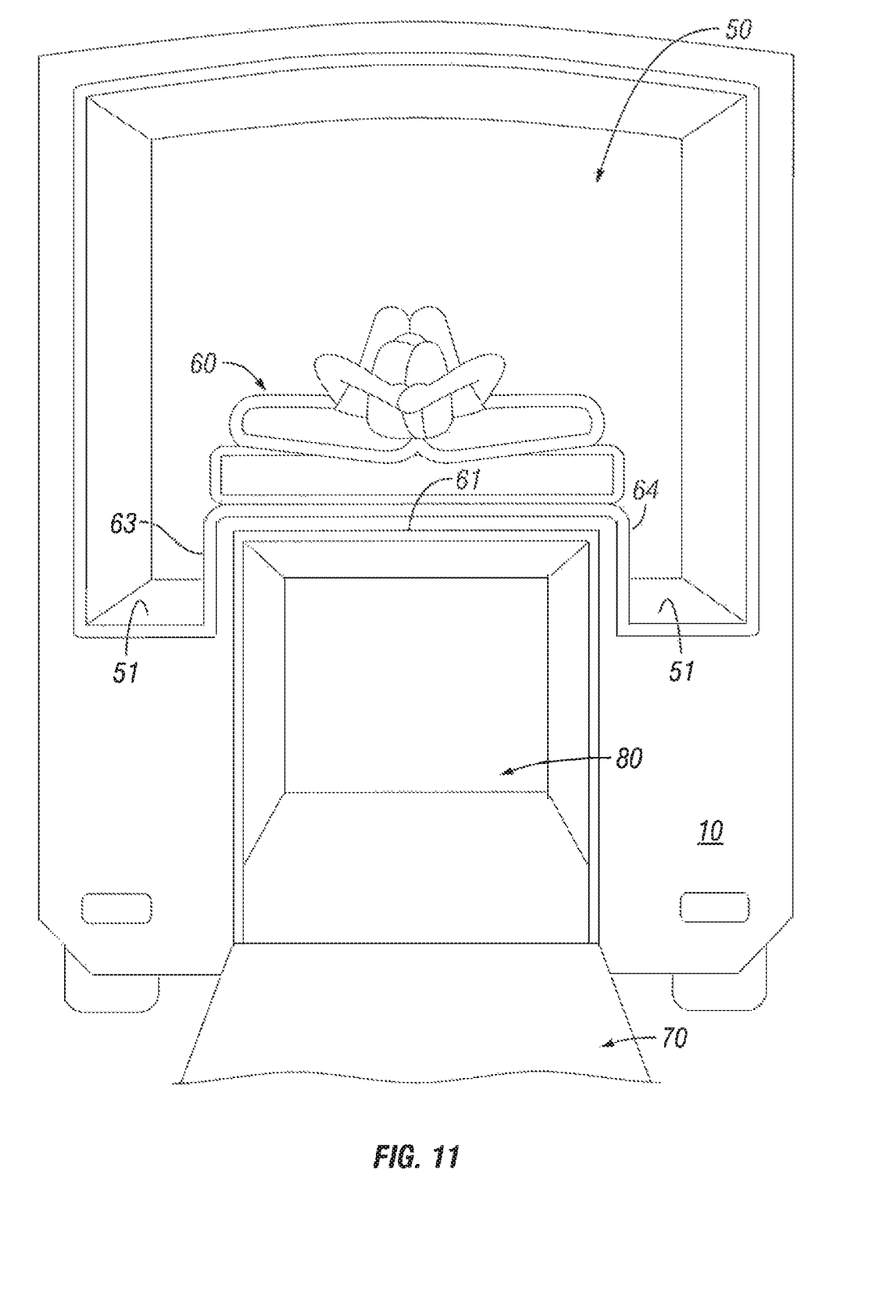
FIG. 11 is a rear schematic view of the garage and interior of the recreational vehicle shown in FIG. 1.

Beams 93D support floor 81 of garage 80. In this manner, floor 81 is lower than floor 41 of second living area 40. By lowering floor 81 of garage 80, floor 51 of third living area 50 can be lowered relative to the ceiling of third living area 50 so as to provide sufficient clearance for users to stand upright. Similarly, platform 61 of bed 60 can be raised without positioning it uncomfortably close to the ceiling of third living area 50 while at the same time providing sufficient clearance in garage 80 to accommodate snowmobiles, dirt bikes and other items typically transported in toy hauler recreational vehicles. This is shown schematically in FIG. 11.

Figure 12:
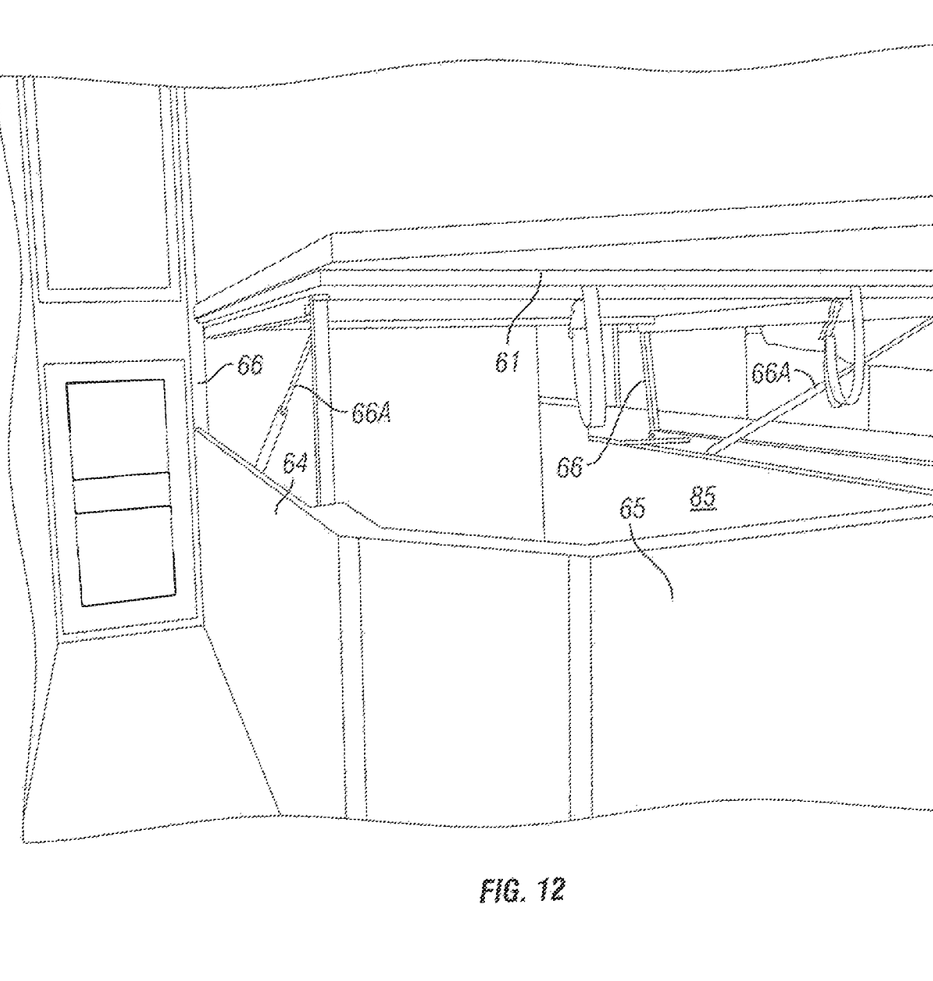
FIG. 12 is a perspective view of another embodiment of a bed that is a component of the recreational vehicle shown in FIG. 1.

Although the present invention has been shown and described in detail, the same is to be taken by way of illustration only and not by way of limitation. Numerous modifications can be made to the embodiments disclosed without departing from the scope of the invention. For example, bed 60 could include one or more assist devices, such as gas struts 66A, to assist in raising and lowering platform 61. This embodiment is shown in FIG. 12 with platform 61 in the raised position.

We claim:

1. A recreational vehicle comprising:
   a first living area having a first floor;
   a second living area having a second floor located at a level below the first floor of the first living area;
   a third living area having a third floor located at a level above the level of the second floor of the second living area;
   a bed located in the third living area and moveable between a lowered position and a raised position; and
   a garage located below the third living area, the garage including a garage floor, a first side wall, a front wall, a second side wall, and a ceiling, wherein the garage has an adjustable height defined by a distance between the garage floor and the ceiling, wherein the adjustable height is greater when the bed is in the raised position than the adjustable height in the lowered position.

2. The recreational vehicle of claim 1, wherein the bed includes an upper surface for supporting a mattress.

3. The recreational vehicle of claim 2, wherein the bed includes a lower surface opposite the upper surface.

4. The recreational vehicle of claim 3, wherein the ceiling of the garage is defined at least in part by the lower surface of the bed.

5. The recreational vehicle of claim 1, wherein the bed is movable between the lowered position and the raised position by one or more pivoting swing arms.

6. The recreational vehicle of claim 1, further comprising:
   a fold-down ramp door for providing access to the garage.

7. The recreational vehicle of claim 1, wherein the garage floor is lower than the second floor of the second living area.

8. The recreational vehicle of claim 1, further comprising:
   a chassis having:
      a first section located beneath the first living area, a second section located beneath the second living area, a third section located beneath the third living area and the garage,
      a pair of longitudinally extending side rails extending along at least the second section, and
      a truss located in the second section, the truss having a first end connected to one of the pair of side rails and a second end connected to the other side rail.

9. The recreational vehicle of claim 8, wherein the pair of side rails extends along the third section, wherein the chassis includes:
   a beam located in the third section, the beam having a first end coupled to one of the pair of side rails and a second end coupled to the other side rail.

10. The recreational vehicle of claim 9, wherein the chassis includes a reinforcing member connected to at least one of the side rails in the third section.

11. The recreational vehicle of claim 10, wherein the reinforcing member is a vertically extending I-beam.

12. The recreational vehicle of claim 10, wherein the chassis further includes a second reinforcing member connected to at least one of the side rails in the third section and a third reinforcing member connecting the first reinforcing member and the second reinforcing member.

13. The recreational vehicle of claim 8, wherein the first section of the chassis includes a second pair of longitudinally extending side rails.

14. The recreational vehicle of claim 8, wherein the third section does not include a truss.

15. The recreational vehicle of claim 1, further comprising:
   a first set of steps between the first living area and the second living area; and
   a second set of steps between the second living area and the third living area.

16. The recreational vehicle of claim 1, wherein the garage includes an inner side wall and an inner front wall.

17. The recreational vehicle of claim 16, wherein the inner side wall and the inner front wall form a partial boundary of a first space of the garage, wherein the first side wall, the front wall, and the second side wall form a partial boundary of a second space of the garage.

18. The recreational vehicle of claim 17, wherein the second space is larger than the first space.

19. The recreational vehicle of claim 16, wherein the inner side wall and the inner front wall are connected to the bed and are moveable between the lowered position and the raised position.

20. The recreational vehicle of claim 16, wherein the garage comprises a lower ceiling positioned below the ceiling and above the garage floor.

21. The recreational vehicle of claim 1, further comprising:
   a front, hitch end and a rear, garage end, wherein the first living area is near the front, hitch end, wherein the third living area is near the rear, garage end.

22. The recreational vehicle of claim 9, wherein the first end of the beam is directly coupled to one of the side rails and the second end is directly coupled to the other side rail.

23. The recreational vehicle of claim 21, wherein the second living area is positioned between the first living area and the third living area.

24. The recreational vehicle of claim 8, wherein the pair of side rails extends along the third section, wherein the chassis includes:
   multiple beams located in the third section extending between the pair of side rails.

25. The recreational vehicle of claim 1, further comprising:
   a chassis having:
      a first section located beneath the first living area, a second section located beneath the second living area, a third section located beneath the third living area and the garage,
      a pair of longitudinally extending side rails extending along at least the second section and the third section, and
      beams located in the third section between the pair of side rails and having a top surface located below the pair of side rails.

* * * * *